2,732,408

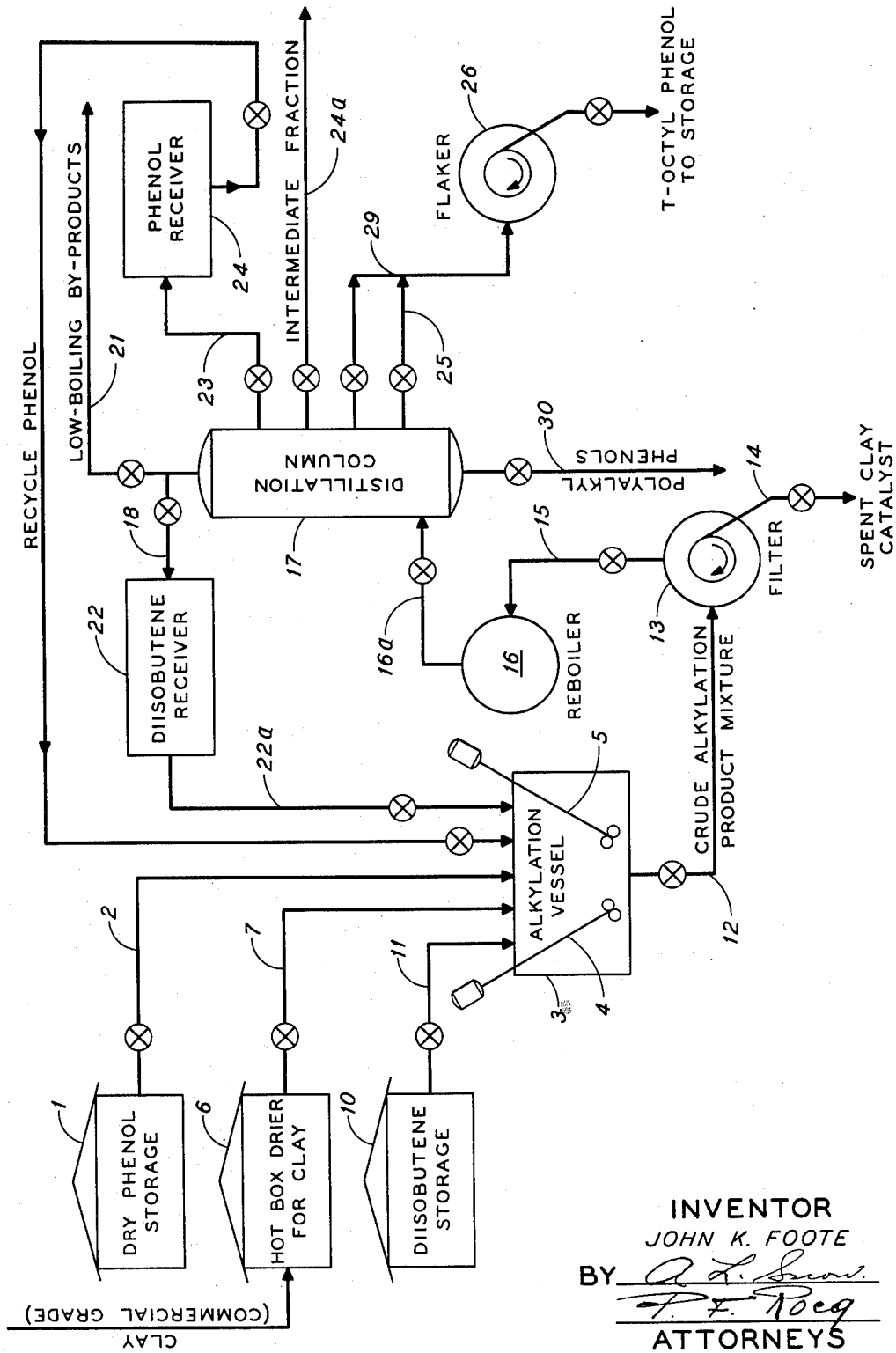

PROCESS FOR MAKING TERTIARY-OCTYLPHENOL

John K. Foote, El Cerrito, Calif., assignor to California Research Corporation, San Francisco, Calif., a corporation of Delaware Application June 29, 1953, Serial No. 364,554

4 Claims. (Cl. 260—624)

The present invention relates to a process of preparing tertiary-octylphenol.

The preparation of alkylated phenols has been described in the art. The conventional mode of effecting this preparation involves alkylating phenol with an olefin corresponding to the alkyl group to be introduced into the aromatic ring in the presence of a catalyst, e. g., sulfuric acid or a Friedel-Crafts catalyst such as aluminum chloride, aluminum bromide, ferric chloride, stannic chloride, boron fluoride, hydrogen fluoride, and acid activated bleaching earths, for example, Tonsil, Filtrol, Superfiltrol, and the like.

Among the various alkylated phenols, tertiary-octylphenol represents a particularly valuable compound. It is usually prepared by the alkylation of phenol with diisobutene and is employed as an intermediate for the preparation of nonionic octylphenol polyglycol ethers, which are obtained either by condensing tertiary-octylphenol with an alkylene oxide in the presence of catalytic amounts of an alkali metal hydroxide or alkali metal carbonate, or by other suitable methods such as are, for instance, described in U. S. Patent No. 2,213,477 issued to Steindorff et al. The surface-active ethers obtained in this manner are used in a variety of applications: As textile assistants, cotton and wool detergents, wetting agents, through-dyeing agents, foam agents, levelling agents, emulsifiers, dispersing agents, and dishwashing compounds, etc. Acetyl derivatives of tertiary-octylphenol are good plasticizers; amino-derivatives find application as developers in photography; sulfonated derivatives are useful as surfactants, and chlorinated derivatives are used as bactericides.

However, production of tertiary-octylphenol by the aforementioned alkylation reaction of phenol and diisobutene is not always satisfactory insofar as the homogeneity (purity) and the yield of the desired octylphenol product are concerned. Furthermore, employment of some of the otherwise effective alkylation catalysts, such as sulfuric acid and boron trifluoride, introduces the disadvantage of corrosiveness to the metal parts in the alkylation equipment. On the other hand, application of aluminum chloride as a catalyst requires large quantities of the catalyst and raises considerably the costs of the process. Boron trifluoride and hydrogen fluoride, when employed as catalysts, tend to associate with the alkylation product, occasioning inordinate losses of the catalyst and bringing about difficult problems of catalyst recovery. In addition, in the presence of hydrogen fluoride diisobutene tends to depolymerize, the result being formation of considerable quantities of tertiary-butylphenol in addition to the desired tertiary-octylphenol.

When acid-activated bleaching earths or clays, such as Tonsil, Filtrol, and the like, are employed to catalyze the alkylation of phenol with diisobutene at temperatures from about 150 to 200° C., depolymerization of diisobutene is also observed. On the other hand, when these activated clays, ordinarily supplied to the trade with an average moisture content of from more than 5 to as high as 25%, are employed as catalysts at lower temperatures, namely, from about 40 to about 90° C., the yields of tertiary-octylphenol are low, being at best of the order of 65 to 70% of the theory (based on diisobutene). The resulting tertiary-octylphenol product contains a rather large percentage of by-product impurity, does not have the required congealing point of 79–81° C., as set forth in the specifications by the industry, and the products derived by condensing this octylphenol with alkylene oxides display less satisfactory surface-active properties when employed as detergents and wetting agents.

I have found that tertiary-octylphenol of good quality can be produced in high yield by condensing phenol and diisobutene in the presence of a dried acid-activated clay catalyst. By employing commercial clay dried to a moisture content from about 0.5 to less than about 5%, it is possible to secure conversions of tertiary-octylphenol in the order of 80 to 90%, and even more, of the theory (based on diisobutene). The production of this improved tertiary-octylphenol is effected as follows: An acid-activated clay catalyst is dried, e. g., in an oven, at a temperature above 100° C. and as high as about 160° C. for a time sufficient to reduce the moisture content thereof, i. e., water physically adsorbed by the clay, to a level of from 0.5 to 5.0%, and preferably from 1.0 to 2.0%, by weight of the clay. In other words, the drying treatment to about 160° C. removes most of the water physically adsorbed by the clay, leaving therein the structural water such as lattice water and interlattice water. The moisture content is determined by azeotropic distillation with toluene as follows: A sample of dried clay is charged into a distillation flask containing toluene and provided with a water trap. The resulting suspension of clay in toluene is refluxed until no more water collects in the trap. The ratio in per cent of the weight of the water thus collected to the weight of the initial dried clay sample defines the moisture content of the clay. The dried catalyst is charged together with dry commercial phenol into an alkylation vessel, where the mixture is agitated at a temperature from about 30 to about 90° C. Diisobutene is added to the phenol-clay at such a rate that the reaction temperature is maintained in the range from 30 to 90° C. The rate of addition can be accelerated if efficient cooling of the reaction mixture is provided, e. g., with the aid of cooling coils. After the required amount of diisobutene has been added, the mixture is maintained at the same temperature of 30 to 90° C. with continuous stirring for a time sufficient to complete the reaction (ordinarily 3 to 4 hours will suffice). Thereupon, the clay catalyst is filtered out, and the filtrate is subjected either to a striping or a fractional distillation, depending upon the quality of the ultimately desired tertiary-octylphenol. In either case, any unreacted phenol and diisobutene are separated from the tertiary-octyl product and recycled to the alkylation vessel. The final product may then be reduced to the commercially preferred flake form and stored in drums or bins.

The mole ratio of phenol to diisobutene can be as low as 1:1. However, a 2:1 mole ratio is preferred in order to minimize formation of polyalkyl phenols and to decrease thereby the consumption of reactants. The proportion of clay catalyst can vary from 5 to 40% based on the weight of phenol, and preferably from 10 to 20% by weight. Clay may be dried to the desired moisture content (0.5 to about 5%, and preferably from 1–2%, by weight) in an oven by heating the commercial clay material at a temperature above 100° C. to as high as 160°, C., and then mixed with the separately dried phenol, or the two may be mixed together and dried by azeotropic distillation with toluene, methylene chloride, chloroform, xylene or other appropriate solvents. In this case, following the azeotropic distillation, it may be necessary to add water (moisture) to the dried clay in order to attain the desired moisture content of 0.5 to about 5%, and preferably 1.0 to 2.0% by weight, of the clay. Of course, each of them, i. e., clay and phenol, may be dried and introduced into the alkylation vessel separately. Furthermore, whenever the alkylation reaction is to be effected at a temperature lower than the melting point of the reaction mixture, i. e., about 79–81° C., an appropriate solvent such as toluene should be employed to maintain fluidity of the reaction mixture.

A flow diagram of the preparation of tertiary-octylphenol is given in the attached drawing. In this diagram dry phenol from storage tank 1 is charged through line 2 to alkylation vessel 3, preferably constructed of steel, and provided with stirrers 4 and 5. The acid-activated clay catalyst is dried in a hot box drier to the desired moisture content and admitted through line 7 into reactor 3. Diisobutene is fed from storage tank 10 through line 11 into reactor 3. Upon completion of alkylation, the reaction product mixture is sent through line 12 to a filter 13 (e. g., an Oliver filter), whence clay is filtered out by way of line 14 with some unavoidable though slight loss (less than 10%) of the reaction product retained by the clay. However, if so desired, the product held up by the clay can be recovered therefrom by washing with a suitable solvent, e. g., toluene, methanol, etc. On leaving filter 13 the filtrate is sent through line 15, reboiler 16 (optional) and line 16a to a distillation column 17 which may be operated either continuously or batch-wise. Low-boiling alkylation by-products, small amounts of which may be formed in reactor 3, are withdrawn overhead through line 21. Unreacted diisobutene, if any, may be taken overhead as the next fraction through line 18 and into receiver 22, whence, if desired, it may be recycled through line 22a to alkylation veessel 3. Recovery of this diisobutene fraction is followed by (1) distillation of the side-cut of unreacted phenol which leaves column 17 through line 23 for receiver 24, whence it is recycled to the alkylation vessel or reactor 3, and (2) by distillation of an intermediate fraction boiling between 120 and 188° C. at 50 mm. Hg leaving through line 24a to be stored or disposed of, as may be desired. The bottoms fraction boiling above 188° C. at 50 mm. Hg is either taken out as such through line 25 and sent, first, to flaker 26 and thence to storage, or is subjected to an additional fractionation. This fractionation serves to separate the tertiary-octylphenol product from higher-boiling polyalkyl phenols (boiling above 192° C. at 50 mm. Hg) which are rejected through line 30 from the system. The "distilled" tertiary-octylphenol product is sent through line 29 to flaker 26 and thence to storage.

The conversions (based on diisobutene) range from 85 to 95% for the "stripped" product (i. e., the product containing polyalkyl phenols boiling above the boiling point of pure tertiary-octylphenol) and from 75 to 85% for the "distilled" product (i. e., one from which polyalkyl phenols boiling higher than tertiary-octylphenol have been removed by the additional fractional distillation step).

The results of a series of comparative test runs tabulated in the table, unmistakably point out the many advantages gained by the employment of dry acid-activated clay catalysts in the manufacture of tertiary-octylphenol. In making these runs, the following procedure was employed: Two moles of dry phenol and an amount of Superfiltrol clay, dried to less than about 2% total moisture and equal to 20% by weight of the phenol, and 20% by weight (also based on phenol) of toluene were charged into the alkylation vessel provided with stirrers and an air-cooled reflux condenser. The charge was heated to 80° C. with continuous stirring, whereupon heating was discontinued and diisobutene was added slowly at such a rate that the temperature remained in the range from 80 to 85° C. After the addition was complete, the mixture was stirred at the same temperature from 80 to 85° C. for an additional 4 hours. Thereupon, the clay catalyst was filtered off, washed with toluene, and the combined filtrates were stripped up to 102° C. at 50 mm. Hg pressure to remove toluene and low-boiling by-products (the major part of the toluene solvent was taken out at atmospheric pressure at 110° C.). The resulting crude product was then subjected to a stripping distillation, and two fractions, one boiling from about 102° C. to about 120° C. at 50 mm. Hg, and the other boiling from about 120 to about 188° C. at 50 mm. Hg, were collected overhead. These two fractions consisted of phenol and by-products boiling from 120 to 188° C. at 50 mm. Hg, respectively. The tertiary-octylphenol bottoms product was a pale, straw-colored liquid which crystallized upon cooling and was found to have a congealing point in the range from 76 to 80° C. When a purer tertiary-octylphenol product was desired, this bottoms fraction was distilled, tertiary-octylphenol distilling between 188 and 192° C. at 50 mm. Hg. The residue which varied in amount from about 5 to about 10% of the weight of the total alkylation product, and boiled above 192° C. at 50 mm., largely consisted of higher boiling polyalkylphenols.

TABLE

*Summary of experimental data on the alkylation of phenol with diisobutene using Superfiltrol clay catalyst dried to a water content of 1 to 2% by weight*

| Test Run No. | Condensation Temp., ° C. | Percent Conversion to t-octylphenol based on the Diisobutene charged | | Congealing point of t-octylphenol, ° C. | | Percent by Weight Intermediate Fraction, B. P. 120–188° C. at 50 mm. Hg [3] |
|---|---|---|---|---|---|---|
| | | Stripped | Distilled | Stripped | Distilled | |
| 1 | 30–35 | 97 | 82 | | 79–81 | 5.0 |
| 2 | 70–75 | 86 | | 78–80 | | 4.5 |
| 3 | 80–85 | 90 | 82 | 78–80 | 79–81 | 4.7 |
| 4 | 85–90 | 87 | | 76–78 | | |
| 5 | 100–105 | 68 | 52 | | 79–81 | 22.0 |
| 6 | [1] 80–85 | 53 | 44 | | | 5.4 |
| 7 | [1] 110–115 | 61 | 40 | | | 23.0 |
| 8 | [2] 78–80 | 86 | | 77–79 | | 8.5 |
| 9 | [2] 150–160 | 17 | 14 | | | 55.0 |

[1] Clay contained about 18% water.
[2] Phenol-clay mixture dried to 0% water content by azeotropic distillation prior to the addition of the olefin.
[3] Predominantly tertiary-butylphenol and some phenolic ethers.

The advantages which are obtained by the use of acid-activated clay dried to a moisture content from 0.5 to 5% in accordance with the invention are apparent from the consideration of the data in the above table. When a conventional clay catalyst containing moisture in excess of 5% was employed, the reaction occurred at a slower rate, and conversions were low. At higher temperatures, side reactions occurred, increasing the amount of the intermediate fraction. On the other hand, the use of a clay catalyst entirely free from moisture promoted side reactions and decreased the conversions. When the clay catalyst, dried to a degree of moisture within the range specified by the invention, was employed for the alkylation of phenol with diisobutene at temperatures from about 30 to about 90° C., and particularly at temperatures from 75 to 85° C., conversions were unusually high, namely, from 86 to 90%, and the intermediate fraction (boiling from 120 to 188° C. at 50 mm. Hg) was never greater than 5% by weight.

Additional advantages of employing clay catalysts containing 0.5 to less than 5% by weight of water are: the possibility of employing steel equipment, since the corrosion risks due to the presence of moisture are reduced; the saving of the phenol and diisobutene reagents, because of the suppression of side-reactions (depolymerization, etc.) and consequent formation of lower-boiling alkyl phenols and side-reaction products. Additionally, the crude "stripped" tertiary-octylphenol product has a lighter color than similar products obtained by employing Friedel-Crafts catalysts for the alkylation of phenol and diisobutene.

On comparing the surface-active properties of non-ionic polyglycol ethers of tertiary-octylphenol prepared in accordance with the present invention, it has been observed that the various properties such as detergency, wetting power, foaming power of the ethers manufactured using "stripped" tertiary-octylphenol (i. e., one containing higher boiling polyalkylphenol impurity) were substantially equivalent to those of the ethers manufactured using "distilled" tertiary-octylphenol. This is a significant advantage, which by eliminating one fractional distillation step from the process without any substantial ill effect on the desired surface-active properties of the ultimate, non-ionic ethers of this "stripped" octylphenol, simplifies the operation of the process and reduces the total costs thereof.

It is to be understood that the above description is given merely by way of illustration and is not limitative of the invention, and that any modifications in the operating conditions and equipment which do not depart from the scope and the spirit thereof are to be included within the definitions of the appended claims.

I claim:

1. A process for preparing tertiary-octylphenol which comprises reacting substantially anhydrous phenol with substantially anhydrous diisobutene at a temperature from about 30 to about 90° C. in the presence of an acid-activated clay characterized by a moisture content of from about 0.5 to about 5% by weight, removable by azeotropic distillation with toluene.

2. A process for preparing tertiary-octylphenol which comprises reacting substantially anhydrous phenol with substantially anhydrous diisobutene at a temperature from from about 75 to about 85° C. in the presence of an acid-activated clay characterized by a moisture content of from about 0.5 to about 5% by weight, removable by azeotropic distillation with toluene.

3. A process for preparing tertiary-octylphenol which comprises reacting substantially anhydrous phenol with substantially anhydrous diisobutene at a temperature from about 30 to about 90° C. in the presence of an acid-activated clay characterized by a moisture content of from about 1.0 to about 2.0% by weight, removable by azeotropic distillation with toluene.

4. A process as described in claim 1, wherein said reaction of phenol with diisobutene is carried out in the presence of toluene.

References Cited in the file of this patent

UNITED STATES PATENTS

| | | |
|---|---|---|
| 2,008,032 | Niederl | July 16, 1935 |
| 2,054,270 | Schoeller et al. | Sept. 15, 1936 |
| 2,086,810 | Langwell et al. | July 13, 1937 |
| 2,115,884 | Schollkopf | May 3, 1938 |